United States Patent
Brookes et al.

(10) Patent No.: US 9,296,462 B1
(45) Date of Patent: Mar. 29, 2016

(54) FLIGHT TERMINATION SYSTEM FOR A BALLOON

(71) Applicant: Google Inc., Mountain View, CA (US)

(72) Inventors: Kyle Brookes, Redwood City, CA (US); Ytai Ben-tsvi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 14/244,042

(22) Filed: Apr. 3, 2014

(51) Int. Cl.
- *B64B 1/40* (2006.01)
- *B64B 1/58* (2006.01)
- *F41J 9/08* (2006.01)
- *B64B 1/46* (2006.01)

(52) U.S. Cl.
CPC ........................................ *B64B 1/46* (2013.01)

(58) Field of Classification Search
CPC .............. B64B 1/62; B64B 1/46; B64B 1/48; B64B 1/64
See application file for complete search history.

(56) References Cited

U.S. PATENT DOCUMENTS

| | | |
|---|---|---|
| 2,756,948 A | 7/1956 | Winzen et al. |
| 2,900,147 A | 8/1959 | Huch et al. |
| 3,041,019 A | 6/1962 | Froehlich |
| 3,119,578 A | 1/1964 | Borgeson et al. |
| 3,131,889 A | 5/1964 | Yost |
| 3,451,649 A | 6/1969 | Weiss et al. |
| 3,860,201 A | 1/1975 | Hall |
| 4,077,588 A | 3/1978 | Hurst |
| 4,262,864 A | 4/1981 | Eshoo |
| 4,434,958 A | 3/1984 | Rougeron et al. |
| 4,494,714 A | 1/1985 | Hill et al. |
| 5,992,795 A | 11/1999 | Tockert |
| 6,325,329 B1 | 12/2001 | Meadows |
| 7,203,491 B2 | 4/2007 | Knoblach et al. |
| 7,275,496 B2 | 10/2007 | French et al. |
| 7,356,390 B2 | 4/2008 | Knoblach et al. |
| 7,648,102 B2 | 1/2010 | French et al. |
| 8,256,716 B2 | 9/2012 | Dietrich et al. |
| 8,644,789 B2 | 2/2014 | Knoblach et al. |
| 8,882,026 B2 | 11/2014 | Huens |
| 2005/0006523 A1 | 1/2005 | French et al. |
| 2005/0224639 A1 | 10/2005 | Kavanagh |
| 2006/0192054 A1 | 8/2006 | Lachenmeier |
| 2007/0199503 A1 | 8/2007 | French et al. |
| 2009/0272840 A1 | 11/2009 | Dietrich et al. |
| 2010/0123040 A1 | 5/2010 | Baxter et al. |
| 2011/0297784 A1 | 12/2011 | Huens |
| 2014/0203135 A1 | 7/2014 | Walter |

FOREIGN PATENT DOCUMENTS

| | | |
|---|---|---|
| GB | 555831 A | 9/1943 |
| GB | 749791 A | 5/1956 |

OTHER PUBLICATIONS anatine_aero. Bovine Aerospace. The sky is not our limit. Tag Archives: weather balloon. Jun. 5, 2013, 14 pages. Retrieved from <http://bovineaerospace.wordpress.com/tag/weather-balloon/>.

*Primary Examiner* — Philip J Bonzell (74) *Attorney, Agent, or Firm* — Lerner, David, Littenberg, Krumholz & Mentlik, LLP (57) ABSTRACT

A system for terminating flight of a balloon having a balloon envelope is provided. The system includes an apparatus attached to the balloon. The apparatus includes a flexible tube that has first and second ends with a hollow tube portion disposed there between and a device attached to the flexible tube. The first end of the tube is sealed around a preconfigured opening in a balloon envelope and the second end is sealed shut. The device includes a main body that has an opening holding an actuating member that has a cavity and a cutting element. The cavity is arranged to hold at least a portion of the flexible tube. When activated, the device causes contact between the actuating member and the cutting element so as to cut open the partial portion of the flexible tube for allowing lift gas to escape the balloon envelope through the hollow tube portion.

20 Claims, 9 Drawing Sheets

FLIGHT TERMINATION SYSTEM FOR A BALLOON

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network. Because of the various forces experienced by these balloons during deployment and operation, there is a balancing of needs between flexibility and stability of materials. As such, the balloons include a flexible envelope made of material that may be configured in sections or lobes to create a "pumpkin" or lobed balloon. These lobes are supported by a plurality of tendons. During normal operations, the balloon envelope is filled with gas so that it can float above the Earth. At some point, the balloon may need to be brought back to the ground, for example, for retrieval, maintenance or servicing of balloon components.

BRIEF SUMMARY

Aspects of the present disclosure are advantageous for providing an apparatus for terminating flight of a balloon. In one embodiment, the apparatus includes a flexible tube that has first and second ends with a hollow tube portion disposed there between and a device attached to the flexible tube. The first end of the tube is sealed around a preconfigured opening in a balloon envelope and the second end is sealed shut. The device includes a main body that has an opening holding an actuating member that has a cavity and a cutting element. The cavity is arranged to hold at least a portion of the flexible tube. When activated, the device causes contact between the actuating member and the cutting element so as to cut open the partial portion of the flexible tube for allowing lift gas to escape the balloon envelope through the hollow tube portion.

In one example, the device further includes an end cap that has a capsule device coupled to the actuating member. When triggered, the capsule device generates a pulse of gas pressure to move the actuating member from a first position to a second position within the main body. The main body further includes a tube in communication with the opening in the main body. The tube is arranged to hold the actuating member away from the cutting element until the capsule device is triggered. The pulse of gas pressure causes the actuating member to thrust towards the cutting element with sufficient force to penetrate the flexible tube.

To generate the pulse of gas pressure, the pressurized capsule device is configured to cause an exothermic chemical reaction. In this regard, a control unit in communication with the device is configured to remotely activate the pressurized capsule device to cause the exothermic chemical reaction.

Another embodiment of the present disclosure provides a system. The system includes a balloon that has a balloon envelope and an apparatus attached to the balloon. The apparatus includes a flexible tube that has first and second ends with a hollow tube portion disposed there between and a device attached to the flexible tube. The first end of the tube is sealed around a preconfigured opening in a balloon envelope and the second end is sealed shut. The device includes a main body that has an opening holding an actuating member that has a cavity and a cutting element. The cavity is arranged to hold at least a portion of the flexible tube. When activated, the device causes contact between the actuating member and the cutting element so as to cut open the partial portion of the flexible tube for allowing lift gas to escape the balloon envelope through the hollow tube portion.

Yet another embodiment of the present disclosure provides a method. The method includes receiving a signal at an electronic cutting device. The electronic cutting device has a cutting element and an actuating member holding at least a sealed portion of a flexible tube. The flexible tube is attached to a preconfigured opening in a balloon envelope. In response to receiving the signal, activating the electronic cutting device to cause the actuating member to move towards the cutting element. Thereafter, an opening is created in the in flexible tube by causing contact between the actuating member and the cutting element so as to cut open the sealed portion of the flexible tube. The opening is configured to allow lift gas to escape and the balloon envelope to descend. In this regard, causing contact includes generating a pulse of gas pressure to thrust the actuating member towards the cutting element with sufficient force to penetrate the flexible tube.

DETAILED DESCRIPTION

The present disclosure generally relates to providing a system for terminating flight of a balloon. In normal operations, the balloon has a balloon envelope is filled with lift gas, such as hydrogen. In some aspects, the system includes a device which can be remotely controlled, while the balloon is in flight, in order to purposefully cut open a hole in the balloon envelope for the lift gas to escape and cause the balloon to descend.

As an example, the device may use an actuating member and a cutting element to cut open a tube shaped plastic film "bag" or flexible tube that has been sealed to the balloon envelope. In this regard, the flexible tube may have two ends that are sealed. One end of the tube can be sealed around edging for a preconfigured opening in the balloon envelope and the other end may be sealed shut. Thereupon, a portion of the tube may be inserted through a cavity of the device so that the device rests between the two ends. When an actuating member of the device is activated, the actuating member causes a portion of the tube to be cut open so that the lift gas can escape from the balloon envelope through the hollow tub portion of the tube. In some examples, a size (e.g., diameter) of the tube may be selected based upon the desired opening needed to bring the balloon safely back to Earth.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Figure 1:
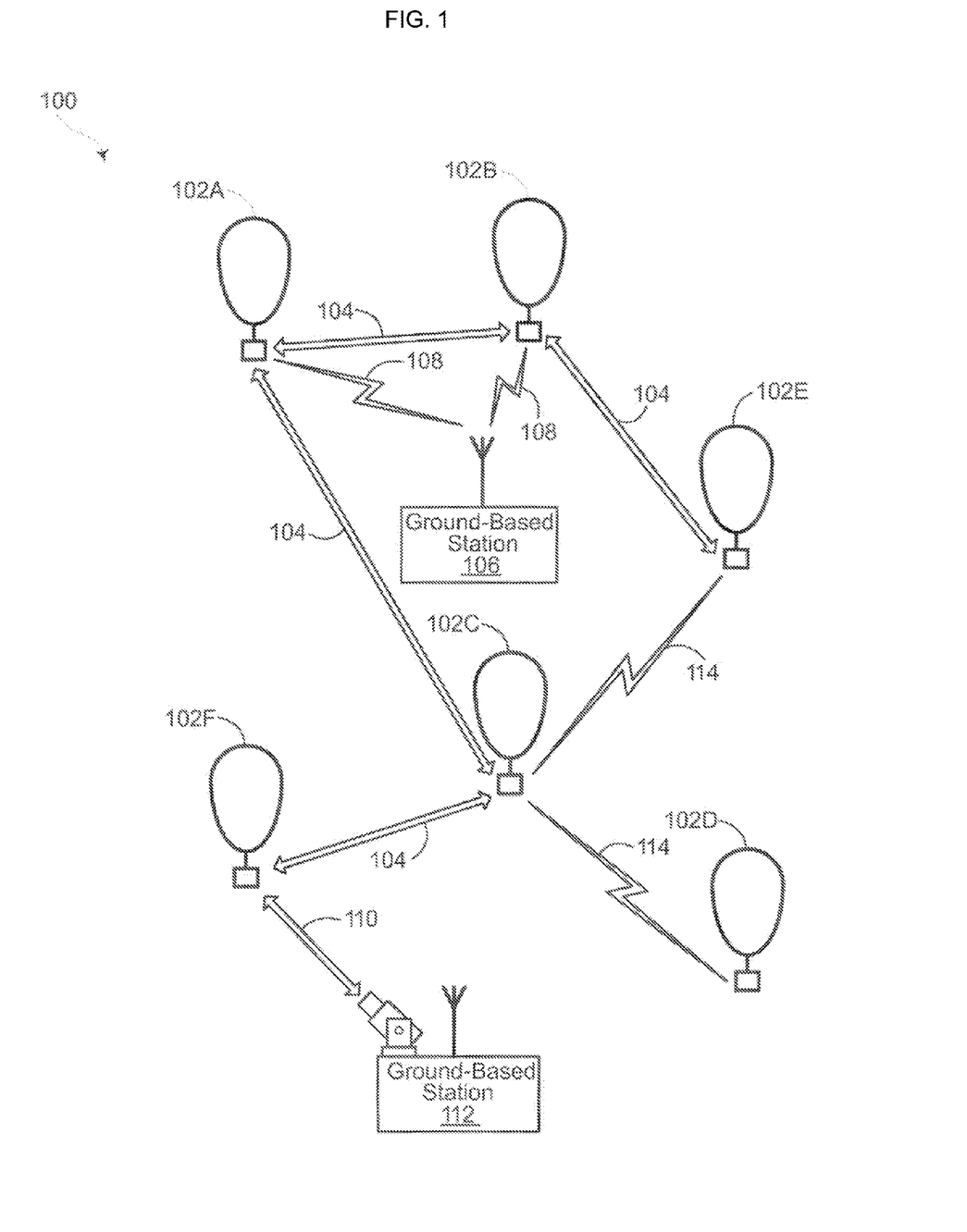
FIG. 1 is a functional diagram of a network in accordance with to aspects of the present disclosure.

FIG. 1 depicts an example network 100 in which a balloon as described above may be used. This example should not be considered as limiting the scope of the disclosure or usefulness of the features of the flight termination system as described herein. For example, the flight termination system can be employed on various types of balloons, such as balloons carrying telescopes, surveillance gear, weather sensors or other types of standalone balloons or balloons used with other types of systems. In this example, network 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
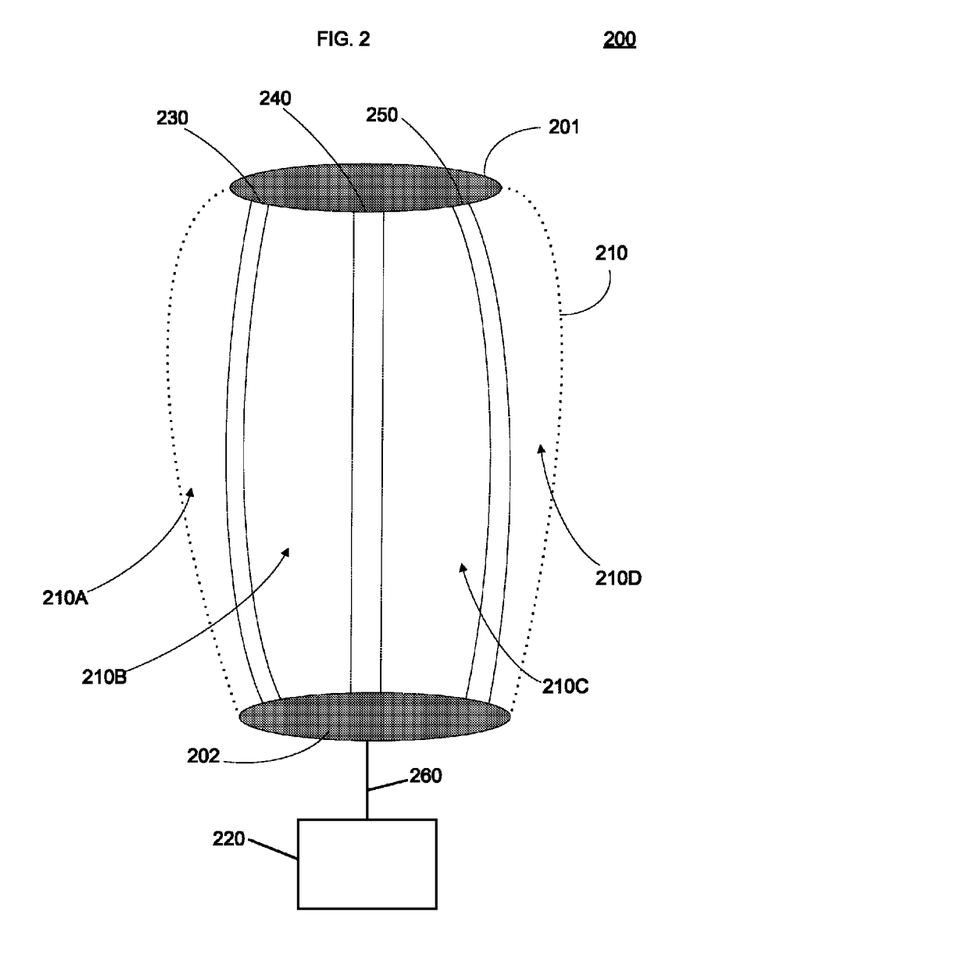
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using a type of plate, such as top cap 201 positioned at the apex of balloon envelope 210. Bottom ends of the tendons 230, 240 and 250 may also be connected to one another. For example, a corresponding plate, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250. In some examples, the top cap 201 may serve a mounting point for certain systems attached to the balloon 200.

During normal operations, the balloon 200 floats in the air like other balloons in the network. However, there are different situations in which the balloon 200 may need to be brought back to the ground. For example, a user may need to bring down the balloon 200 on purpose, for example, to perform maintenance or for retrieval and inspection of certain balloon components.

As noted above, one aspect of the present technology provides a system for remotely terminating flight of a balloon. For example, the techniques disclosed herein seek to release the pressurized lift gas from within the balloon envelope by creating an opening for the gas to escape. In some aspect, the system includes an apparatus that can be configured to rapidly create this opening in the balloon envelope.

Figure 3:
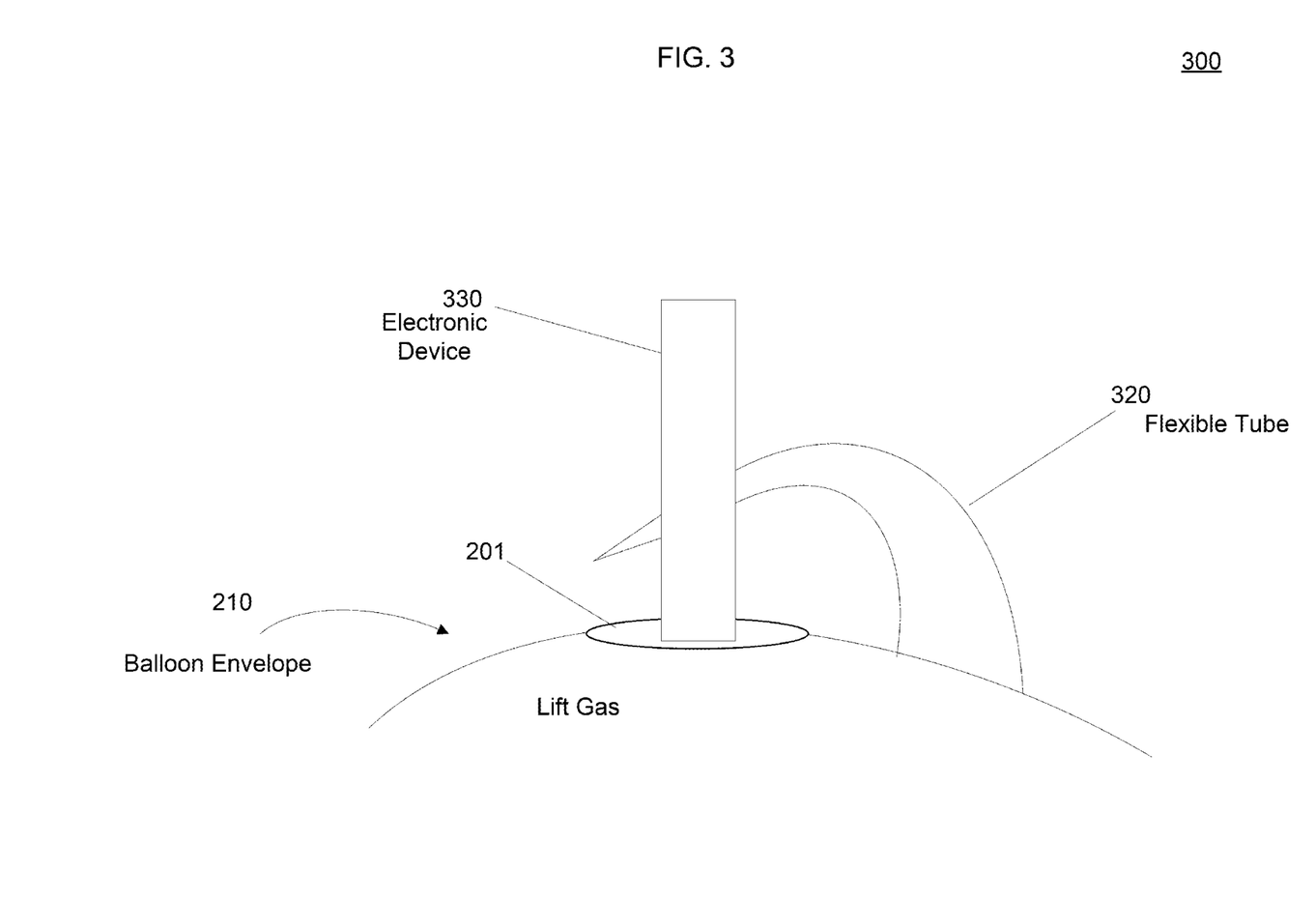
FIG. 3 is an example of a system in accordance with aspects of the present disclosure.

FIG. 3 is an example of a system 300 for creating an opening in a balloon envelope. The system 300 has various components including a flexible tube 320 attached to the balloon envelope 210 and an cutting device 330, such as an electronic cutter, that has an opening (not shown) disposed therein. The flexible tube 320 may be arranged so that a portion of the tube is also disposed within the opening of the electronic device 330. In this regard, the cutting device 330 is configured to cut open this portion of the flexible tube 330. When the cutting device 330 cuts the flexible tube 320, lift gas from within balloon envelope 210 can escape through the tube 320, thereby causing the balloon to descend back to Earth.

The various components of the system 300 may be attached to portions of the balloon envelope 310. In some embodiments, the top cap 201 of the balloon as discussed above may serve as a mounting point for the system 300. For example, the electronic device 330 may be coupled to the top cap 201 using a kind of cable/wire (not shown) or other kinds of similar restraints. This allows the system 300 to be secured to the balloon structure while also being near a location of the balloon envelope 210.

Figure 4:
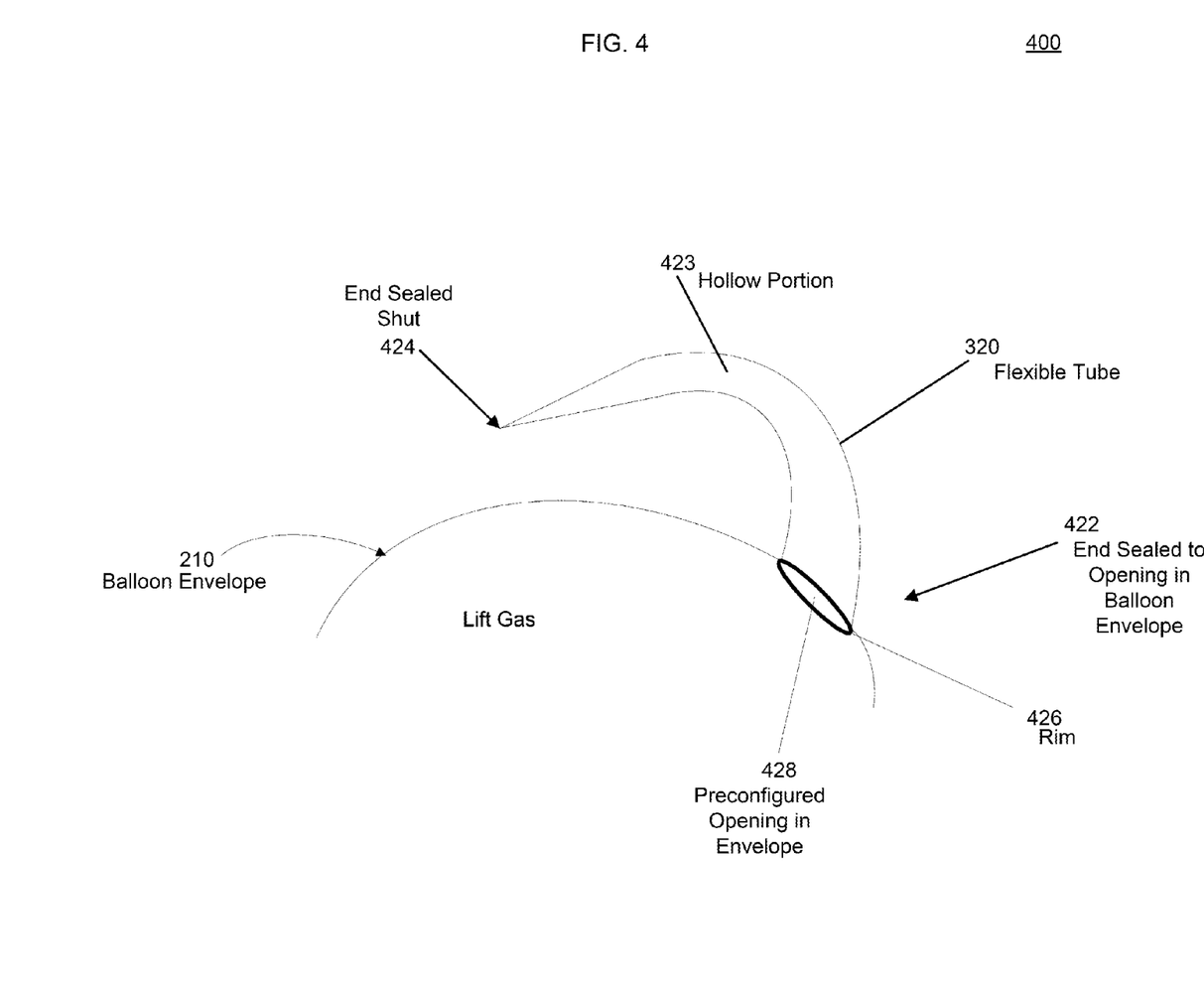
FIG. 4 is an example of a flexible tube in accordance with aspects of the present disclosure.

FIG. 4 is an example 400 of a flexible tube 320. As shown, the flexible tube 320 has a first end 422 and a second end 424. Hollow portion 423 is disposed between the two ends. The first end 422 of the flexible tube 320 can be sealed to a preconfigured opening 428 in balloon envelope 310 and the second end 424 may be sealed shut. For example, the second end 424 may be permanently sealed shut. An advantage of permanently sealing the second end 424 of the flexible tube 320 is that it may provide extra leak prevention of the lift gas.

Flexible tube 320 may be constructed of the same material as the balloon envelope 310. For example, the flexible tube 320 may be constructed from several types of highly flexible yet lightweight materials, e.g., polyethylene, polyethylene terephthalate, chloroprene and etc. While the flexible tube 320 can be of the same material as the balloon envelope 310, it can alternatively be of a different material than the envelope. In some embodiments, the flexible tube 320 can be constructed from any suitable material with similar 210 different strength properties than the balloon envelope 210. For instance, these suitable materials of the flexible tube 320 are capable of being attached to an outer material of the balloon envelope 210 and can withstand air pressure and different temperature extremes at a high altitude.

Hollow portion 423 runs along a lengthwise direction of the tube 320 and extends from the first end 422 to the second end 424. The hollow portion 423 is configured to allow the lift gas from the balloon envelope to pass through it in order to escape from the preconfigured opening 428. For example, a diameter of the hollow portion 423 may be configured or selected depending on the desired pattern of descent for the balloon. If the hollow portion 423 has a relatively large diameter, then when it is cut open the lift gas may escape more rapidly from the preconfigured opening 428 than if the diameter was smaller. If the hollow portion 423 has a relatively small diameter, this may result in a more gradual descent of the balloon, for example, by letting the lift gas escape from the preconfigured opening 428 escape more slowly.

Preconfigured opening 428 has a rim 426 which defines an opening in the balloon envelope 428. In some embodiments, the opening 428 may be disposed in an upper portion of the envelope 428. For example, the opening 428 can be disposed substantially near an apex of the envelope 428. An advantage of making the opening 428 in the upper portion of the envelope 428 is so that the lift gas may escape from near the top of the balloon. This may allow the balloon greater stability as it descends than if the opening were at some other location, for example closer to the bottom plate 202.

In some embodiments, the rim 426 may include extra reinforcement (not shown), such as extra material or stitching, to strengthen a border of the preconfigured opening 428. This reinforcement may allow for greater stability during descent and to prevent the flexible tube 320 from falling apart or becoming otherwise unstable due to stresses caused by internal and external forces. In some embodiments, an airtight seal is made between the flexible tube 320 and the balloon envelope 310.

To attach the flexible tube 320 to the balloon envelope 310, several techniques can be employed. For instance, in some embodiments, the envelope 310 and the tube 320 can be manufactured separately and later joined together. In this example, the flexible tube 320 may be attached to the envelope 310, e.g., by using a type of impulse sealing technique or any other material fusing methods for bonding materials together. Similarly, the second end 424 of the flexible tube 320 can be sealed shut using the same impulse sealing method or other suitable material fusing methods can be employed. In other embodiments, the envelope 310 and flexible tube 320 may be manufactured together so that the tube is an integral part of the balloon envelope 210.

As shown in FIG. 4, the first end 422 of the tube can be secured to the preconfigured opening 428 of the balloon envelope 210. For example, the first end 422 may be completely sealed around the opening 428. This allows the lift gas escaping through the preconfigured opening 429 to primarily pass through the hollow portion 423 of the tube 320. So that the lift gas does not escape from the envelope until desired, the second end 424 of the tube 320 may be sealed tightly shut. When needed, the sealed end of flexible tube 320 can be cut off to let the lift gas escape from the envelope 210.

Figure 5A:
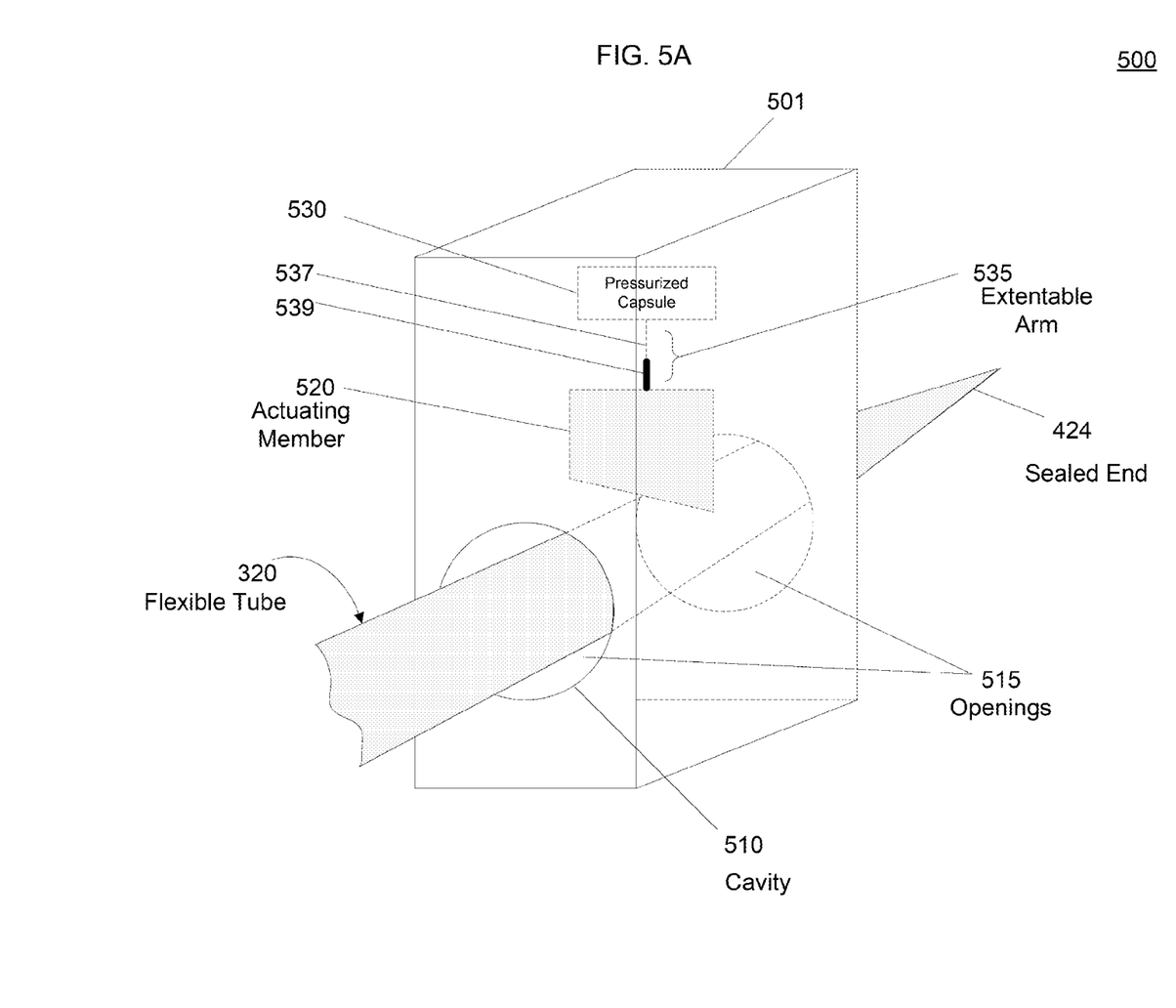
FIG. 5A is an example of a cutting device in accordance with aspects of the present disclosure.

The flexible tube 320 can be opened by cutting the tube open proximate to the sealed end 424 using an electronic cutting device. In FIG. 5A, one example of a cutting device 500 is shown. In this example, the cutting device 500 has a main body 501 for housing various device components that include a cavity 510 for passing objects through the device, an actuating member 520 disposed within this cavity 510, and a pressurized capsule 530 coupled to the actuating member 520 via an extendable arm 535. For example, the extendable arm 535 may be joined to the pressurized capsule 530 using a number of mechanical arm parts (not shown) so that the arm 535 can extend lengthwise from the capsule 530. The extendable arm 535 is configured to move the actuating member 520 in a predetermined direction when the electronic device 500 is activated.

Actuating member 520 acts as a cutting element for the cutting device 500. For example, the actuating member 520 includes a cutting edge (e.g., a sharpened blade) that may be rigid and sharp enough to pierce the flexible tube 320. In some example, the shape of the actuating member 520 can assist in piercing the flexible tube 320. For example, an edge of the actuating member 520 can be shaped into a point or to have jagged edges or various other configurations for creating or cutting an opening in the flexible tube 320. The cutting edge is enclosed in the main body 501 of electronic device 500. Access to this edge is only capable through the cavity 510. This permits the device 510 to be used safely by reducing any possible injury to a user. The actuating member 520 may be arranged so that it can move across the cavity 510 of cutting device 500. As the actuating member 520 passes across this cavity 510, the actuating member is able to cut a portion of the flexible tube disposed therein.

The cavity 510 includes one or more openings 515 that can be configured to pass from one surface of the main body 501 to a surface on an opposite side. This may allow the sealed end 424 of the flexible tube 320 to be inserted through the openings associated with cavity 510. In this regard, the portion of flexible tube 320 proximate to sealed end 424 that passes through the openings 515 in cavity 510 may be cut by the cutting edge of the actuating member 520.

Extendable arm 535 can be extended into engagement with an interior of cavity 510. For example, the extendable arm 535 may include a first portion 537 and a second portion 539 moveably mounted to the first portion for extension of the extendable arm. For this reason, the extendable arm 535 may be coupled to the actuating member 520. This permits the extendable arm 535 to move or otherwise thrust the actuating member 520 towards the flexible tube 320 at a velocity with sufficient force to penetrate the tube material.

To move the actuating member 520, the extendable arm 530 can be attached to a pressurized capsule 540. For example, the pressurized capsule 540 may be configured to generate a gas pressure pulse that can propel the extendable portion of the extendable arm 535. This gas pressure pulse may be produced in several ways. In some examples, the pressurized capsule 540 includes chemical materials (e.g., pyrotechnic material) that when triggered cause an exothermic chemical reaction for production of the gas pressure pulse. In some embodiments, the pressurized capsule 540 may include pressurized gas that when released produces a sufficient gas pressure pulse needed to move the extendable portion of the extendable arm 535 so that the actuating member 520 can cut the flexible tube open.

To trigger the pressurized capsule 540 it may be associated with circuitry (not shown) that may be configured to receive instructions, for example using a receiver, and to trigger/denote the pressurized capsule in response to those instructions. In this regard, the cutting device 500 may be an electronic cutting device with a receiver/transmitter for processing these signals and/or instructions.

Figure 5B:
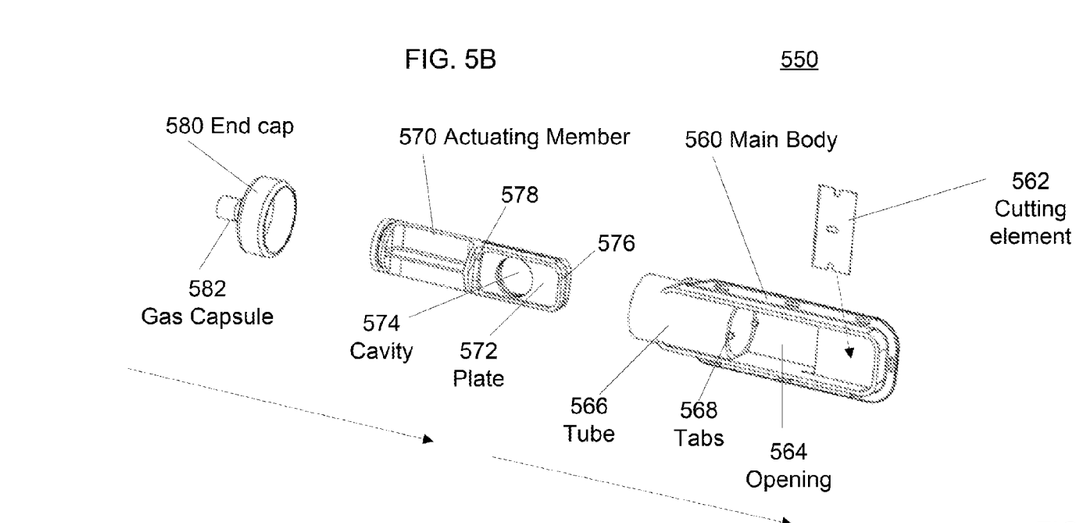
FIG. 5B is an exploded perspective view of another example of a cutting device in accordance with aspects of the present disclosure.

FIG. 5B is an exploded perspective view of another example of a cutting device 550. In this example, the cutting device 550 includes several components that include a main body 560 for housing the various device components that include cutting element 562, e.g., a sharpened razor blade, an actuating member (e.g. an actuating piston) that may be disposed with the main body 560, and an end cap 580 with a gas capsule 582 that can be coupled to actuating member 570. The gas capsule 582 may be used to generate a pulse of gas pressure for moving the actuating member 570 through the main body 560 of device 550.

Main body 560 may be of a material, such as a plastic, metal or some combination thereof, which can be formed into a rigid structure of a predetermined shape. In this regard, the main body 560 may be configured to hold or house the cutting element 562 and the actuating member 570. For example, the main body 560 includes a first end where the cutting element 562 may be held in a fixed position and a second end that includes tube 566 for receiving the actuating member 570. Here, the actuating member 570 may be configured to slideably engage with the tube 566. The opening 562 in the device 550 may be disposed between these two ends.

As shown in FIG. 5B, cutting element 562 may be enclosed within the main body 560 of cutting device 550. For example, the cutting element 562 can be inserted into the main body 560 through opening 564 or another opening (not shown) in the main body 562 that is configured for the cutting element 562 to pass through. The cutting element 562 is configured to cut open the flexible tube 320. For example, an edge of the cutting element 562 can be shaped into a point or to have jagged and/or sharpened edges or various other configurations for cutting open in the flexible tube 320. In this example, the sharpened edge of the cutting element 562 is direct toward the second end of the main body 560.

At the second end of the main body 560, the cutting device 550 includes a receiving tube. For example, tube 566 can be attached to a portion of the main body 56 that may be in communication with opening 564. The tube 566 is configured so that the actuating member 570 can be inserted and move through the tube to the opening 564. For this reason, an interior shape of the tube 566 and the actuating member 570 are configured to complement each other. For example, the interior shape of the tube 566 and the actuating member 570 may have complementary cross sections, here rounded, so that the actuating member 570 can easily pass through the tube 566. This allows the actuating member 570 to reach the cutting element 562 when desired.

Actuating member 570 includes a plate structure 572 having a cavity 574 disposed therein. The cavity 574 can be arranged within the main body such that the cavity aligns with one or more openings, such as opening 564. In this regard, when aligned, the cavity 574 may hold at least a portion of the flexible tube 320 that passes though opening 564 (not shown in FIG. 5B). For example, the sealed end 424 of the flexible tube 320 may be inserted through the opening and the cavity 574.

When the actuating member 570 makes contact with the cutting element 562, the portion of the flexible tube 320 in the cavity 574 may be cut open. For this purpose, the flexible tube 320 may include a slit, such as a slit 576, in the plate structure 572 that permits the cutting element to reach the part of the tube in the cavity 574. So that the actuating member 570 does not make contact with the cutting element 562 until a desired time (e.g., when the cutting device 550 is activated. In some embodiments, the main body 560 may include one or more breakaway tabs, such as tabs 568.

As shown in FIG. 5B, the tabs 568 are arranged along an opening of tube 566. These tabs 568 are configured to hold the actuating member 570 away from the cutting element 562, but can be broken away when needed. For example, when tube 566 receives the actuating member 570, the tabs 568 may engage a portion of the member 570, such as contact retention/tab breakers 578. In this example, the contact retention/tab breakers 578 are configured to breakaway the tabs 568 when the actuating member 570 is moved towards the cutting element 562 with sufficient force.

To cause the actuating member 570 to move towards the cutting element 562 with sufficient force to breakaway the tabs 568, the gas capsule 582 associated with end cap 580 may be activated. For example, the gas capsule 582 may be configured to generate a gas pressure pulse that can propel the actuating member 578 towards the cutting element 562.

This gas pressure pulse may be produced in several ways. In some examples, the gas capsule 582 includes chemical materials (e.g., pyrotechnic material) that when triggered (e.g., by the current) causes an exothermic chemical reaction for production of the gas pressure pulse. In some embodiments, the gas capsule 582 may include pressurized gas that when released produces a sufficient gas pressure pulse needed to move the actuating member 570 so that the cutting element can cut the flexible tube open.

As with the pressurized capsule described above, the gas capsule 582 may be associated with circuitry (not shown) that may be configured to receive instructions, for example using a receiver, and to activate/trigger the gas capsule to generate the gas pressure pulse in response to those instructions. In this regard, the cutting device 550 may be an electronic cutting device with a receiver/transmitter for processing these signals and/or instructions.

Figure 5C:
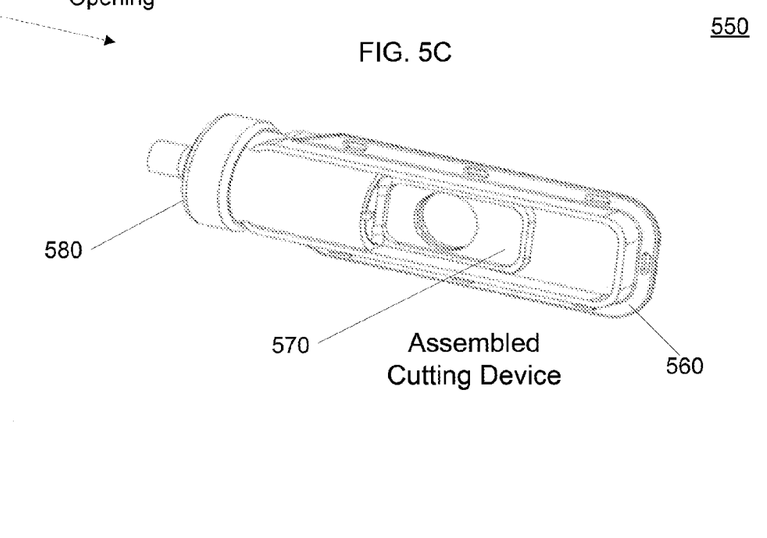
FIG. 5C is an assembled view of the cutting device of FIG. 5B in accordance with aspects of the present disclosure.

Turning to FIG. 5C, an assembled view of the cutting device 550 of FIG. 5B is shown. In one example, to assemble the cutting device 550, the actuating member 570 may be fully inserted into the main body 560 of the device 550. For example, the actuating member 570 may pass through the main body 560 until the contact retention/tab breakers 578 met the breakaway tabs 568. Thereafter, the end cap 580 may be securely placed on over the actuating member 570. After the cutting device has been assembled in can be used as part of the flight termination system.

Figure 6A:
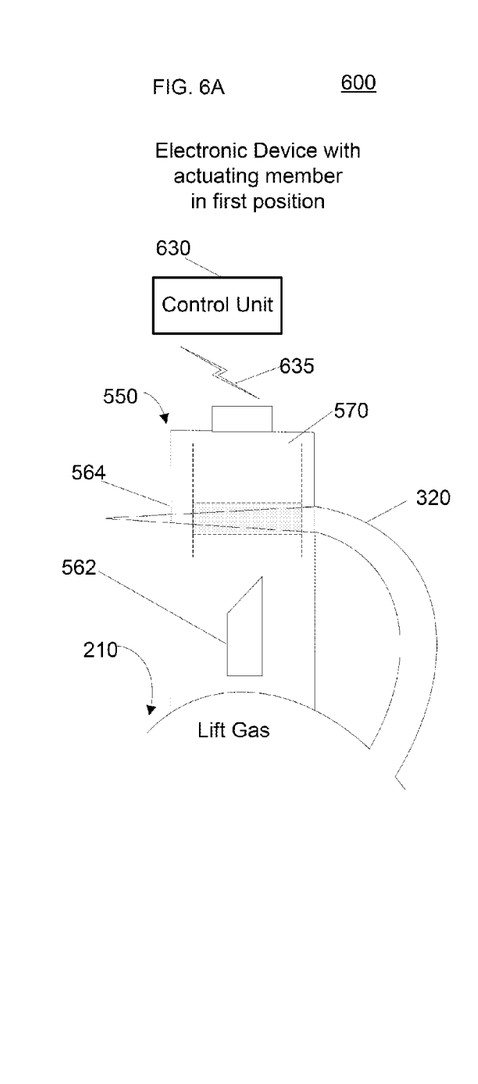
FIGS. 6A-6C are examples of a system employing the electronic device of FIG. 5 in accordance with aspects of the present disclosure.
Figure 6B:
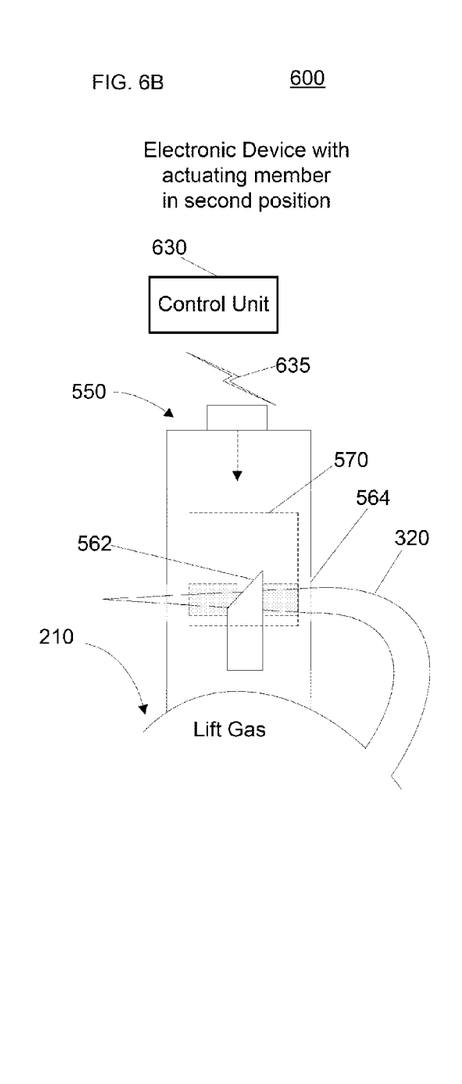

FIGS. 6A-6B are examples of a system 600 employing the cutting device 550 of FIGS. 5B-5C. Here, a side cut-way view of the cutting device 550 is shown. In this example, the system 600 includes a control unit 630 for controlling the cutting device 550 via a communication link 635. As noted above, the cutting device 550 may include circuitry for such as a receiver/transmitter for processing signals or instructions to and from the control unit 630. In some examples, these signals may include instructions for the cutting device 550, to cause the actuating member 520 to move towards cutting element 562 in order to cut open a portion of flexible tube 320. An advantage of the control unit 630 is that it allows a user to be able remotely active the system, while the user is on the ground and the balloon is in flight.

As shown in FIG. 6A, one end of the flexible tube 320 is sealed to balloon envelope 210 and the other end may be inserted into an opening 564 in the electronic device 550. In this example, the flexible tube 320 is shown arranged above the cutting element 562 of the cutting device 550. Initially, the flexible tube 320 may be held upwards, for example, by the actuating member 570 that may be resting in a first position 640 within the opening 564 of cutting device 550. As shown, the flexible tube 320 passes completely through the opening 564 so that the sealed end of the tube 320 can extend outwardly from the electronic device 550.

In FIG. 6B, the actuating member 570 of the cutting device 550 is shown being held in a second position. When the cutting device 550 is activated, for example, in response to an instruction being sent from the control unit 630, the cutting device causes the actuating member 570 to move towards the cutting element 562. For example, when the cutting device 550 is activated, it in turn may activate/trigger or otherwise denote the gas capsule 582 attached to the actuating member 570. The electronic device 550 may be in communication with a device (not shown) for activating the gas capsule 582. For example, the cutting device 550 may execute a command to send an electric current to the gas capsule that starts a reaction for generating the pulse of gas pressure. As noted above, this gas pressure may thrust the actuating member 570 into the second position. In some embodiments, this movement may be done with such force that the cutting element 562 can cut open the flexible tube 320. For example, the cutting element 562 is shown here piercing a portion of the flexible tube 320.

Figure 6C:
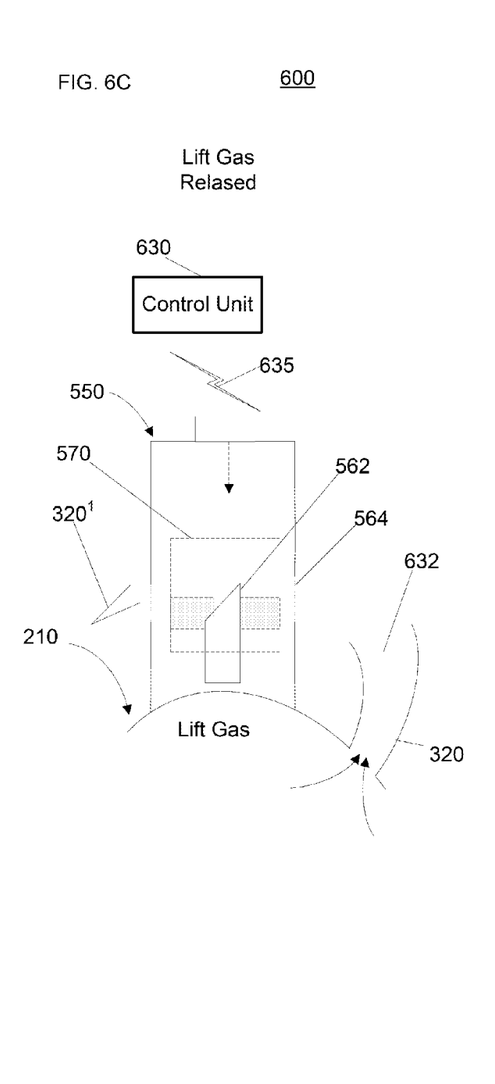

Turning to FIG. 6C, an opening 632 is created after the cutting element 562 pierces the flexible tube 320. As shown, a portion $320^1$ of the flexible tube 320 is cut off to create the opening 632. As discussed above, the cutting element 562 may be of a material capable of penetrating the material of flexible tube 320. In some example, the shape of cutting element 562 can assist in penetrating the flexible tube 320.

Opening 632 of the flexible tube 320 may be in communication with the preconfigured opening in the balloon envelope 210. For example, the flexible tube 320 may be sealed around the preconfigured opening of the balloon envelope 210. This allows lift gas, as represented by the arrows in FIG. 6C, to pass through the hollow portion of flexible tube 320 from the preconfigured opening. Because of this, the balloon begins to descend back to Earth.

Figure 7A:
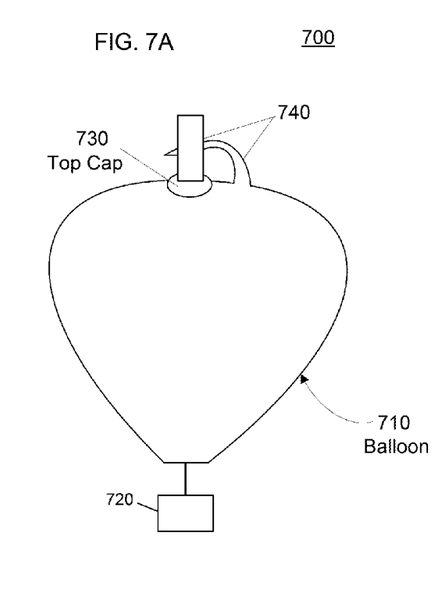
FIGS. 7A-7C are examples of a system terminating the flight of a high altitude balloon in accordance with aspects of the present disclosure.
Figure 7B:
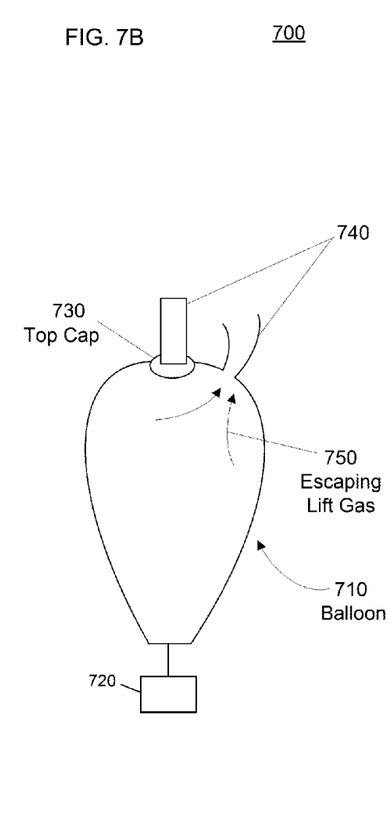
Figure 7C:
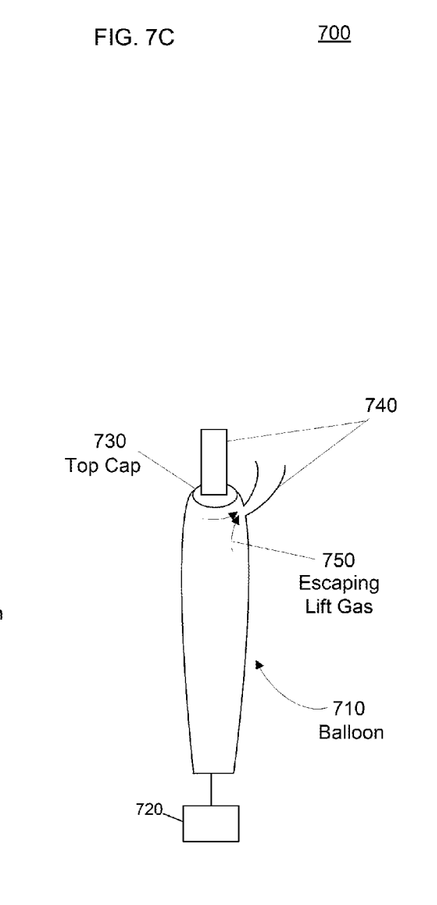

FIGS. 7A-7C are examples of a system terminating the flight of a high altitude balloon. In FIG. 7A, a balloon 710 filled with lift gas is shown carrying a payload 720 in the air. To terminate flight of the balloon 710, a system 740 as described above for terminating flight of the balloon 710 may be attached to a top cap 730. The system, when activated, creates a relatively large opening in the balloon for lift gas to escape. As shown in FIG. 7B, the flight termination system 740, after activation, cuts open a portion of flexible tube attached to preconfigured opening in the balloon envelope 710. For example, this portion includes a flexible tube sealed to a preconfigured opening in the balloon envelope. In FIG. 7B, the balloon 710 starts to descend. This is due to the loss of lift gas through the opening created in the balloon 710. As more lift gas escapes, the balloon 710 further descends. And in FIG. 7C, the balloon is shown even further deflated. By this time, most of the lift gas has been released from the balloon 710 as it approaches the ground.

Example Flow Diagram

As previously discussed, the following operations do not have to be performed in the precise order described below. Rather, as mentioned above, various operations can be handled in a different order or simultaneously, and operations may be added or omitted.

Figure 8:
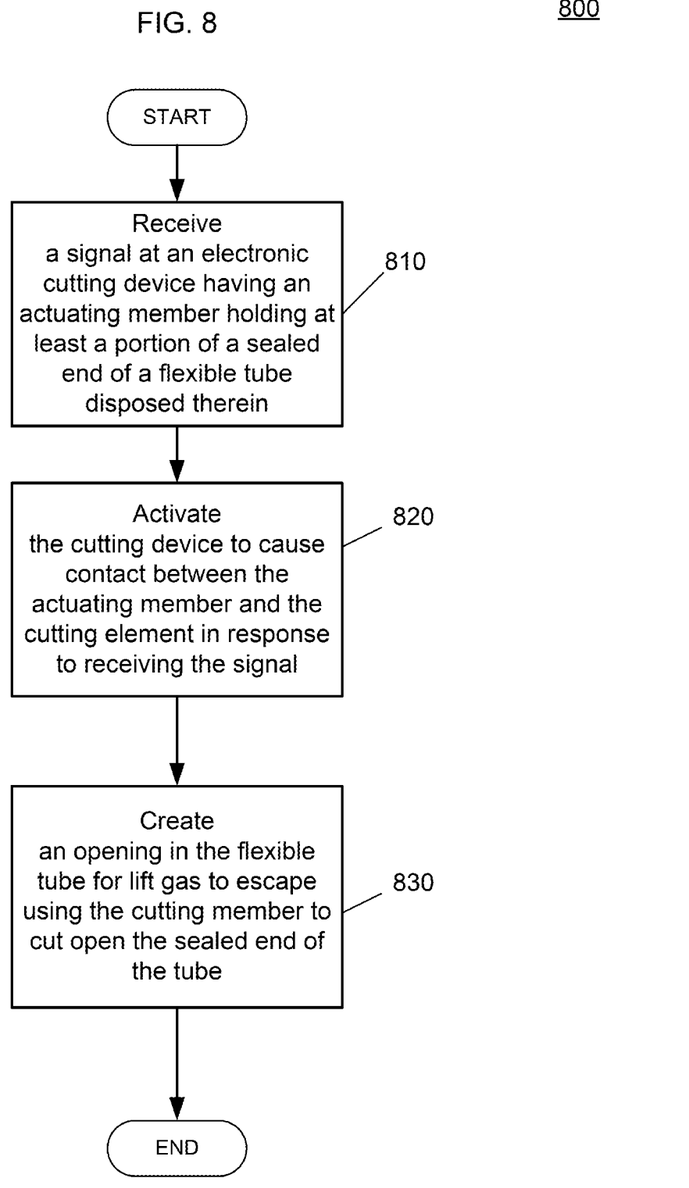
FIG. 8 is a flow diagram depicting an example of a method in accordance with aspects of the disclosure.

FIG. 8 is a flow diagram 800 depicting an example of some of the aspects described above, including, for example, cutting device 500 or 550, that a user may employ to remotely terminate flight of a balloon using existing balloon equipment. In block 810, a signal is received at a cutting device that has an actuating member (e.g., a piston) holding at least a portion of a sealed end of a flexible tube disposed therein. For example, the signal may be sent from a control unit located at a ground-based station. The flexible tube is attached to a preconfigured opening in the balloon envelope. The sealed end of the tube may be inserted through a cavity associated with the actuating member.

In block 820, the cutting device is activated to cause contact between the actuating member holding the flexible tube and a cutting element in response to receiving the signal. For example, when the cutting device is activated, a pressurized capsule attached to the actuating member may produce a gas pulse that moves the member in a predetermined direction towards the cutting element. The movement of the member may be at a certain velocity sufficient enough to penetrate the flexible tube material.

In block 830, an opening in the flexible tube for lift gas to escape is created using the cutting element to cut open the sealed end of the tube. For example, the portion of the flexible tube being held by the actuating member may be cut off so that lift gas can escape. The lift gas passes from the preconfigured opening in the balloon envelope through the tube, and thus causes the balloon to descend.

While the examples above discuss using a single cutting device to cut open the flexible tube attached to the balloon envelope, other modifications are possible while still maintaining functionality of the flight termination system. For example, although the examples above describe a single cutting device in use for a single balloon, multiple cutting devices, such as cutting devices 500 and/or cutting device 550, can be used on the same and/or different flexible tubes attached to a single balloon. In this regard, the cutting devices may be activated all at once or in stages as needed or in case of failure of any of the devices. In addition, the flexible tube or tubes may be attached to multiple preconfigured openings in the balloon envelope. Each preconfigured opening may be configured at both ends of the flexible tube with a cutting device situated proximate to the middle of the tube. In this example, when the cutting device or devices are activated, two openings for the lift gas to escape may be achieved using only one cut. An advantage of using multiple cutting devices and/or flexible tubes is for efficiency and to provide redundant fight termination systems.

In some alternative embodiments, the electronic device may be configured to dissolve or otherwise break away a sealant that is holding the flexible tube closed. Further, other types of cutting devices may be used, such as wrapping a coil of deflagrating cord around the cut area, for burning open portions of the flexible tube to release the lift gas being held within the envelope, thereby causing a termination of the balloon flight.

Most of the foregoing alternative examples are not mutually exclusive, but may be implemented in various combinations to achieve unique advantages. As these and other variations and combinations of the features discussed above can be utilized without departing from the subject matter defined by

The invention claimed is:

1. An apparatus, comprising:
a flexible tube having first and second ends and a hollow tube portion disposed there between, the first end being sealed around a preconfigured opening in a balloon envelope and the second end being sealed shut; and
a device attached to the flexible tube, the device comprising:
a main body having an opening, the opening being arranged to hold a cutting element,
an actuating member having a cavity and being disposed within the main body, the cavity being arranged to hold at least a portion of the flexible tube, and
wherein the device, when activated, being configured to cause contact between the actuating member and the cutting element so as to cut open the portion of the flexible tube for allowing lift gas to escape from the balloon envelope through the hollow tube portion.

2. The apparatus of claim 1, further comprising reinforcements disposed around the preconfigured opening, the reinforcements for confining the preconfigured opening to an upper portion of the balloon envelope.

3. The apparatus of claim 1, wherein a diameter of the hollow tube portion is arranged for the lift gas to rapidly escape from the preconfigured opening of the balloon envelope when the flexible tube is cut open.

4. The apparatus of claim 1, wherein a diameter of the hollow tube portion is arranged for the lift gas to gradually escape from the preconfigured opening of the balloon envelope when the flexible tube is cut open.

5. The apparatus of claim 1, wherein the device further comprises an end cap having a capsule device coupled to the actuating member, the capsule device, when triggered, to generate a pulse of gas pressure to move the actuating member from a first position to a second position within the main body.

6. The apparatus of claim 5, wherein the main body further comprises a tube in communication with the opening in the main body, the tube being arranged to hold the actuating member away from the cutting element until the capsule device is triggered.

7. The apparatus of claim 6, wherein the pulse of gas pressure causes the actuating member to thrust towards the cutting element with sufficient force to penetrate the flexible tube.

8. The apparatus of claim 7, wherein the pressurized capsule device is configured to cause an exothermic chemical reaction to generate the pulse of gas pressure.

9. The apparatus of claim 8, further comprising a control unit in communication with the device, the control unit to remotely activate the exothermic chemical reaction.

10. An system, comprising:
a balloon have a balloon envelope; and
an apparatus coupled to the balloon, the apparatus comprising:
a flexible tube having first and second ends and a hollow tube portion disposed there between, the first end being sealed around a preconfigured opening in a balloon envelope and the second end being sealed shut; and
a device attached to the flexible tube, the device comprising:
a main body having an opening, the opening being arranged to hold a cutting element,
an actuating member having a cavity and being disposed within the main body, the cavity being arranged to hold at least a portion of the flexible tube, and
wherein the device, when activated, being configured to cause contact between the actuating member and the cutting element so as to cut open the portion of the flexible tube for allowing lift gas to escape from the balloon envelope through the hollow tube portion.

11. The system of claim 10, further comprising reinforcements disposed around the preconfigured opening, the reinforcements for confining the preconfigured opening to an upper portion of the balloon envelope.

12. The system of claim 10, wherein a diameter of the hollow tube portion is arranged for the lift gas to rapidly escape from the preconfigured opening of the balloon envelope when the hollow tube portion is cut open.

13. The system of claim 10, wherein a diameter of the hollow tube portion is arranged for the lift gas to gradually escape from the preconfigured opening of the balloon envelope when the flexible tube is cut open.

14. The system of claim 10, wherein the device further comprises an end cap having a capsule device coupled to the actuating member, the capsule device, when triggered, to generate a pulse of gas pressure to move the actuating member from a first position to a second position within the main body.

15. The system of claim 14, wherein the main body further comprises a tube in communication with the opening in the main body, the tube being arranged to hold the actuating member away from the cutting element until the capsule device is triggered.

16. The system of claim 15, wherein the pulse of gas pressure causes the actuating member to thrust towards the cutting element with sufficient force to penetrate the flexible tube.

17. The system of claim 16, wherein the pressurized capsule device is configured to cause an exothermic chemical reaction to generate the pulse of gas pressure.

18. The system of claim 17, further comprising a control unit in communication with the device, the control unit to remotely activate the exothermic chemical reaction.

19. A method, comprising:
receiving a signal at an electronic cutting device, the electronic cutting device having a cutting element and an actuating member holding at least a sealed portion of a flexible tube, wherein the flexible tube is attached to a preconfigured opening in a balloon envelope;
in response to receiving the signal causing, by activating the electronic cutting device, the actuating member to move towards the cutting element; and
creating an opening in the flexible tube by causing contact between the actuating member and the cutting element so as to cut open the sealed portion of the flexible tube, the opening in the flexible tube being arranged to allow lift gas to escape and the balloon envelope to descend.

20. The method of claim 19, wherein causing contact comprises generating a pulse of gas pressure to thrust the actuating member towards the cutting element with sufficient force to penetrate the flexible tube.

* * * * *